Figure 1:
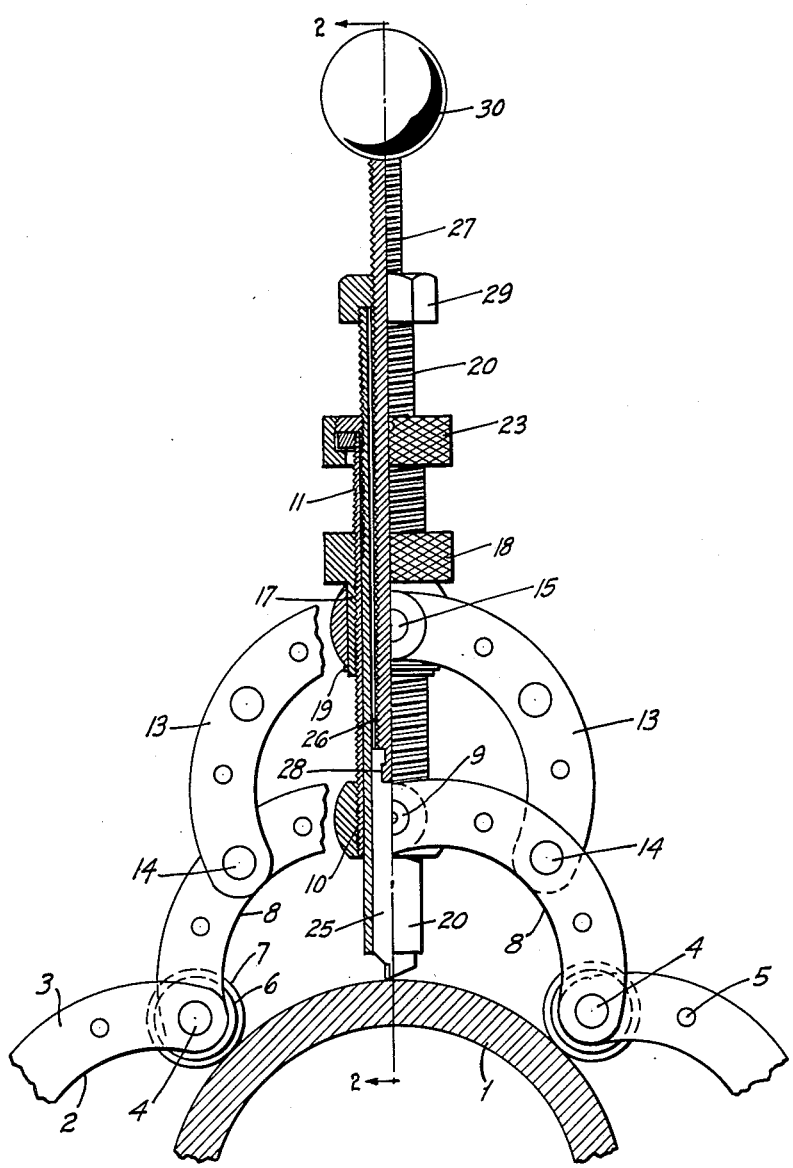

March 3, 1953

J. B. GILL ET AL 2,629,925

EXTERNAL CHAIN TYPE PIPE CUTTING
TOOL WITH CLAMPING MEANS

Filed Jan. 24, 1950

2 SHEETS—SHEET 1

INVENTORS
JOHN B. GILL
RICHARD V. PAGENDARM
BY
A. Schapp
ATTORNEY

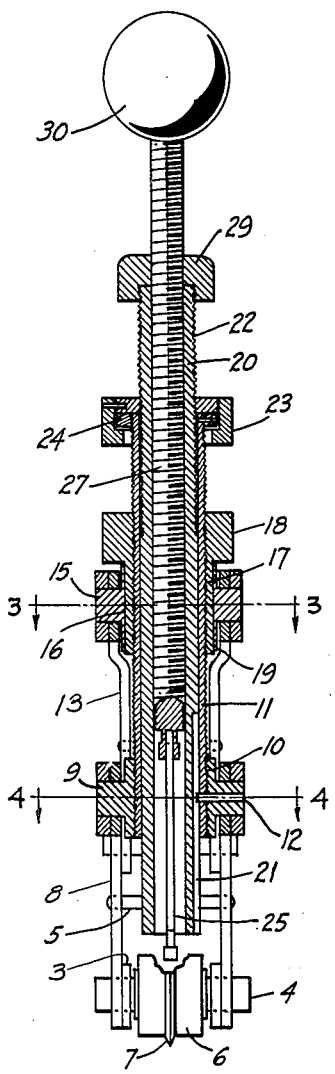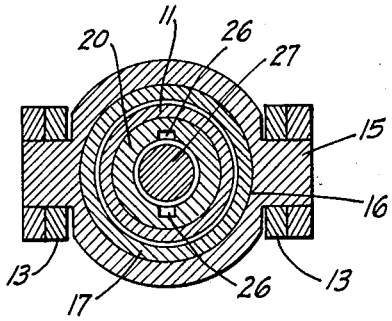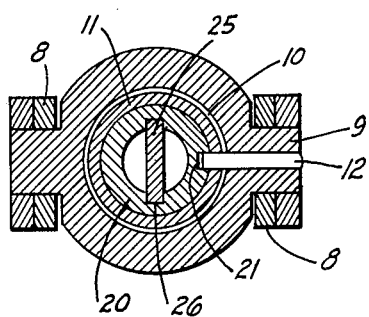

Patented Mar. 3, 1953

2,629,925

UNITED STATES PATENT OFFICE 2,629,925

EXTERNAL CHAIN TYPE PIPE CUTTING TOOL WITH CLAMPING MEANS

John B. Gill, San Francisco, and Richard V. Pagendarm, Oakland, Calif., assignors to Pilot Manufacturing Company, San Francisco, Calif., a corporation of California Application January 24, 1950, Serial No. 140,294

2 Claims. (Cl. 30—100)

1

The present invention relates to improvements in an external chain type pipe cutting tool, and its principal object is to introduce some further developments in connection with the pipe cutting tool described in Patent No. 2,381,156 granted to John B. Gill and Tilford L. Smith, and in Patent No. 2,433,606 granted to John B. Gill and Leonard C. Schomer.

In the former patent it was proposed to provide a pipe cutting tool employing a plurality of arcuate links joined to form a chain adapted to wrap around a pipe to be cut, and to provide means cooperating with any suitable pair of adjacent links for drawing the intervening joints away from the pipe and for drawing the two other joints together, whereby the two links were made to form an arc over the pipe, and whereby the overall length of the chain was reduced. It was further proposed to use a separate handle for turning the chain about the pipe and a separately mounted cutter for cutting into the pipe material as the chain was revolved.

In the second patent a similar chain arrangement was used, but the handle and the chain adjusting means were formed as a unitary structure, whereas the cutter was still carried as an independent unit on a different portion of the chain.

In the present invention it is proposed to combine all three elements, the handle, the chain adjusting means, and the cutter into a single unitary structure.

Further objects and advantages of our invention will appear as the specification proceeds, and the novel features of our invention will be fully defined in the claims attached hereto.

The preferred form of our invention is illustrated in the accompanying drawing, in which Figure 1 shows a side elevation of our improved control means for the pipe cutter chain, the latter being shown in a fragmentary manner, and a portion of the pipe control means being shown in section, Figure 2, a transverse section taken along line 2—2 of Figure 1, Figure 3, a cross-section taken along line 3—3 of Figure 2, and Figure 4, a cross-section taken along line 4—4 of Figure 2.

While we have shown only the preferred form of our invention, we wish to have it understood that various changes and modifications may be made within the scope of the claims attached hereto without departing from the spirit of the invention.

2

Referring to the drawing in detail, a fragmentary portion of the pipe to be cut is indicated at 1, the pipe being preferably made of asbestos cement or cast iron.

The chain 2 adapted to be wrapped around the pipe is shown only in a fragmentary manner and may be made generally in accordance with the teachings of the two prior patents. For the purpose of the present description it may suffice to state that it consists of a plurality of arcuate links 3 joined by pivots 4 to form a continuous chain, the links being made in pairs as shown in Figure 2 and being held in spaced relation by means of suitable spacing members 5. Each of the pivots, except for those specially constructed for the purposes of the present invention, carries a roller 6 having a central tapered ridge 7 adapted to form a tracer groove about the pipe at the beginning of the cutting operation.

For the purposes of the present invention we select a pair of adjacent links identified by the numeral 8, these two links being interconnected by a pivot 9, the body portion of which is formed with a transverse threaded hole 10 having a sleeve 11 threaded thereinto, the sleeve being locked to the pivot by means of a pin 12.

Two auxiliary links 13 are pivoted to the two links 8 intermediate the lengths thereof as at 14 and are hinged to one another by a pivot 15, which latter is arranged in radial alinement with the pivot 9. The pivot 15 is formed with a transverse hole 16, and a nut 17 is revolvably mounted in this hole and is held against endwise movement in the pivot by means of a knurled head 18 at the top, and a collar 19 at the bottom. The nut is threaded on the sleeve 11 so as to hold the latter in radial relation with respect to the pipe.

It will thus be noted that when the nut 17 is turned, the sleeve 11 will move the pivot 9 toward or away from the pipe and such motion will be accompanied by a spreading or contracting of the links 8, with the result that the overall length of the chain is increased or decreased.

A guide tube 20 is slidable longitudinally in the sleeve 11 and is held against rotary motion by a portion of the pin 12 extending into a longitudinal slot 21 of the guide tube. The upper end of the guide tube is threaded as at 22, and the tube is operated for endwise movement by a nut 23 disposed on the upper end of the sleeve 11 and revolvable on a collar 24. The lower end of the guide tube is intended to extend to a point within fairly close proximity to the pipe to be cut. The position of the pivot 9 is adjusted by means of the nut 17, the guide tube is moved with the pivot but may then be readjusted by operation of the nut 23.

A flat cutter blade 25 is slidably mounted in the lower end of the guide tube, the edges of the blades sliding in longitudinal slots 26 disposed in the inner wall of the tube, the slots extending through the entire length of the latter.

A shank 27 is mounted in the guide tube above the cutter, and its lower end is secured upon the upper end of the cutter with freedom of revolving movement, as by the tongue and groove engagement shown at 28. The shank is threaded and passes through a nut 29 secured upon the end of the guide tube. A button 30 is secured upon the upper end of the shank 27.

The nut 29 is secured upon the guide tube 20 with freedom of removability, as by the threads shown.

In operation, the chain 2 is first placed about the pipe 1, the chain being fitted to the approximate dimensions of the pipe by the insertion or removal of links. After the chain is placed it is tightened upon the pipe by operation of the nut 17, to draw the pivot 9 away from the pipe circumference sufficiently to ensure a close fit. Next the tube 20 is adjusted so that its lower end is disposed in fairly close proximity to the surface of the pipe. This is done by operation of the nut 23.

Now, or before the last named operation, as the case may be, the entire chain is turned about the pipe by an operator grasping the button 30 and using the entire assembly as a handle, so as to cause the ridges 7 of the rollers 6 to cut a tracer groove into the surface of the pipe.

Next the cutting edge of the blade 25 is brought to bear upon the pipe by a turning movement of the shank 27 executed through the button 30.

The operator may then continue and finish the cutting operation by swinging the button 30 about the pipe and at the same time deepening the cut by a slight turning movement of the button.

If it is desired to renew the blade, the shank and the blade may be pulled out of the guide tube as a unit upon loosening of the nut 29.

We claim:

1. In a pipe cutter of the character described, a chain adapted for placing about a pipe and including two links having a pivot connecting the same, an auxiliary link for each of said links and having an end hinged to its respective link intermediate the length of said link, a pivot connecting the other ends of the auxiliary links in radial alinement with the first pivot, a radial sleeve extending through both of the pivots and fixed with respect to one of the pivots and slidable with respect to the other pivot, a nut revolvable in the second pivot and threaded on the sleeve, means for holding the nut against axial motion with respect to the second pivot whereby the pivots are moved toward or away from each other when the nut is turned, and cutting means for the pipe mounted inside the sleeve.

2. In a pipe cutter of the character described, a chain adapted for placing about a pipe and including two links having a pivot connecting the same, an auxiliary link for each of said links and having an end hinged to its respective link and intermediate the length of said link, a pivot connecting the other ends of the auxiliary links in radial alinement with the first pivot, a radial sleeve extending through both of the pivots and fixed with respect to one of the pivots and slidable with respect to the other pivot, a nut revolvable in the second pivot and threaded on the sleeve, means for holding the nut against axial motion with respect to the second pivot whereby the pivots are moved toward or away from each other when the nut is turned, and cutting means for the pipe mounted inside the sleeve, the cutting means comprising a guide tube slidable in the sleeve, cooperative means on the sleeve, and the guide tube for adjusting the guide tube to bring its inner end into desired proximity with respect to the pipe, a cutter slidable in the guide tube, and cooperative means on the cutter and the guide tube for progressively advancing the cutter into the pipe material.

JOHN B. GILL.
RICHARD V. PAGENDARM.

REFERENCES CITED

The following references are of record in the file of this patent:

UNITED STATES PATENTS

| Number | Name | Date |
| --- | --- | --- |
| 1,118,349 | Johnson | Nov. 24, 1914 |
| 1,130,395 | Gilmour | Mar. 2, 1915 |
| 1,256,799 | Hime | Feb. 19, 1918 |
| 2,433,606 | Gill et al. | Dec. 30, 1947 |